(12) United States Patent
Yang (10) Patent No.: US 11,565,404 B2
(45) Date of Patent: Jan. 31, 2023

(54) PROMPT METHOD AND SYSTEM FOR BUILDING MODULAR APPARATUS

(71) Applicant: Beijing KEYi Technology Co., Ltd., Beijing (CN)

(72) Inventor: Jianbo Yang, Beijing (CN)

(73) Assignee: BEIJING KEYI TECHNOLOGY CO., LTD., Beijing (CN)

(*) Notice: Subject to any disclaimer, the term of this patent is extended or adjusted under 35 U.S.C. 154(b) by 295 days.

(21) Appl. No.: 16/905,894

(22) Filed: Jun. 18, 2020

(65) Prior Publication Data

US 2020/0391376 A1 Dec. 17, 2020

Related U.S. Application Data

(63) Continuation of application No. PCT/CN2018/121437, filed on Dec. 17, 2018.

(30) Foreign Application Priority Data

Dec. 19, 2017 (CN) .......................... 201711379019.1

(51) Int. Cl.
  *B25J 9/08* (2006.01)
  *B23P 19/04* (2006.01)
  *B25J 9/16* (2006.01)

(52) U.S. Cl.
  CPC ............. *B25J 9/08* (2013.01); *B23P 19/04* (2013.01); *B25J 9/1617* (2013.01)

(58) Field of Classification Search
  CPC . H04L 65/4015; H04L 51/046; H04L 63/102; H04L 65/403; G01C 15/002; B25J 9/08; G06F 3/013
  See application file for complete search history.

(56) References Cited

U.S. PATENT DOCUMENTS

2006/0095159 A1   5/2006   Desmond
2006/0100739 A1   5/2006   Raffle
(Continued)

FOREIGN PATENT DOCUMENTS

CN    106272550 A     1/2017
CN    108115686       6/2018
DE    102015015142    6/2017

OTHER PUBLICATIONS

"Research on Bionic Motion Control of Naturally Reconfigurable Robots in Unstructured Environments", Qiao Guifang, Chinese Doctoral Dissertation, Full-text Database Information Technology Series, Jan. 15, 2017.

*Primary Examiner* — Iqbal Zaidi
(74) *Attorney, Agent, or Firm* — Andrew C. Cheng (57) ABSTRACT

The present disclosure provides a prompt method and system for building a modular apparatus. The method comprises: S1: obtaining configuration information of a target modular apparatus which comprises M unit-modules connected to each other by a docking part; S2: obtaining configuration information of a currently constructed entity which comprises N unit-modules connected to each other by a docking part, N being less than M; S3: calculating at least a position of the docking part where the $(N+1)^{th}$ unit-module should be connected to the constructed entity; and S4: sending out prompt information according to at least the position of the docking part where the $(N+1)^{th}$ unit-module should be connected to the constructed entity calculated in step S3, so as to prompt at least the position of the docking part where the $(N+1)^{th}$ unit-module should be connected.

14 Claims, 5 Drawing Sheets

(56) References Cited

U.S. PATENT DOCUMENTS

2014/0145935 A1\* 5/2014 Sztuk .................. G06T 7/74
                                                                                        345/156
2017/0157768 A1 6/2017 Buthala \* cited by examiner

PROMPT METHOD AND SYSTEM FOR BUILDING MODULAR APPARATUS

TECHNICAL FIELD

The present disclosure relates to the field of robots, in particular to a prompt method and system for building a modular apparatus.

BACKGROUND

Robots have been widely used in life and industrial fields, e.g., teaching to develop students' creative thinking ability in education, and operations such as welding, spraying, assembling and transporting in automated production. Although the robot has great flexibility and elasticity as an execution system and may execute different work tasks, the existing robots often have only one main function for specific use purposes and occasions, and the degree of freedom and configuration are fixed. As a result, they lack the expansibility of functions and the reconstruct ability of configuration. In addition, it is very expensive to develop a specific robot for each field and application, which severely restricts the promotion and application of the robots. Therefore, reconstructable robots with multiple modules came into being, wherein the multiple modules can be differently jointed to produce robots with different degrees of freedom and configurations, so that the flexibility and elasticity in robot construction are greatly improved, and a user is provided with a reconstructable space to change the degree of freedom and configuration of the robot according to requirements. Thus, the research and the development of the reconstructable robots have become an important direction in robots at present.

However, when the user reconstructs a specific robot, joint errors often occur. Therefore, the reconstruction work becomes complicated and time-consuming, and corresponding solutions are urgently needed.

SUMMARY

In order to overcome the problem that joint errors often occur during the reconstruction process of existing reconstructable robots, the present disclosure provides a prompt method and system for building a modular apparatus.

The solution to the technical problem in the present disclosure is to provide a prompt method for building a modular apparatus, the modular apparatus comprising at least two unit-modules and each unit-module comprising at least a docking part by which the unit-modules are connected to each other. The prompt method for building the modular apparatus comprises: S1: obtaining the configuration information of a target modular apparatus which comprises M unit-modules connected to each other by the docking part; S2: obtaining the configuration information of a currently constructed entity which comprises N unit-modules connected to each other by the docking part, N being less than M; S3: calculating at least the position of the docking part where a $(N+1)^{th}$ unit-module should be connected to the constructed entity according to the configuration information of the target modular apparatus and the configuration information of the currently constructed entity; and S4: sending out prompt information according to at least the position of the docking part where the $(N+1)^{th}$ unit-module should be connected to the constructed entity calculated in step S3, so as to at least prompt the position of the docking part where the $(N+1)^{th}$ unit-module should be connected.

Preferably, the prompt method for building the modular apparatus further comprises: S5: connecting at least the $(N+1)^{th}$ unit-module to the constructed entity according to the prompt information; and repeating steps S2 to S5 to complete the connection between the unit-modules to obtain the modular apparatus.

Preferably, an indicating function member is arranged at the docking part of the unit-module, and the indicating function member is controlled in step S4 to send out indicating information according to the position of the docking part on the constructed entity to be connected calculated in step S3.

Preferably, before step S4, the method further comprises: displaying the configuration of the constructed entity by a display screen in three-dimensional simulation; and expressing in step S4 the prompt information by a three-dimensional simulation model in the ways as follows: displaying in a specific color a portion of the three-dimensional simulation model corresponding to the position of the docking part, or pointing by an indicator to the portion of the three-dimensional simulation model corresponding to the position of the docking part, or demonstrating a joint procedure dynamically.

Preferably, the configuration information of the target modular apparatus in step S1 comes from a database storing configuration information corresponding to a plurality of modular apparatuses.

Preferably, between step S2 and step S3, the method further comprises: Sa: determining whether the constructed entity in step S2 matches the target modular apparatus; and performing the S3, if the constructed entity matches the target modular apparatus or otherwise performing Sb: prompting a joint error.

Preferably, the configuration information comprises one or more pieces of type information representing the type of the unit-modules, quantity information representing the number of the unit-modules, and interface identification information representing a connection relationship of the unit-modules; and in step Sb, when one or more pieces of information in the configuration information of the constructed entity indicate errors, prompting different kinds of joint errors according to the different pieces of error information.

Preferably, the at least two unit-modules comprises one main unit-module and at least one sub-unit-module, and the main unit-module and the sub-unit-module are in wired connection through the docking part or both in wireless connection and in wired connection through the docking part; different docking parts of the main unit-module and the sub-unit-module are provided with different pieces of interface identification information; and the sub-unit-module directly connected to the main unit-module is defined as a first-level sub-unit-module, the sub-unit-module connected to the first-level sub-unit-module is defined as a second-level sub-unit-module, and the sub-unit-module connected to the M-level sub-unit-module is defined as a (M+1)-level sub-unit-module, M being an integer greater than or equal to 1. In step S2, the configuration information of the constructed entity is obtained by N sub-unit-modules through a face recognition process. The face recognition process comprises: S21: sending a first electrical signal to instruct the sub-unit-module to perform the face recognition; S22: sending out different second electrical signals by different docking parts of the main unit-module, or sending out second electrical signals by different docking parts of the main unit-module in time sequence; S23: determining by the first-level sub-unit-module the interface identification information of the main unit-module to which the first-level sub-unit-module is to be connected according to the second electrical signal received by the first-level sub-unit-module, and obtaining by the first-level sub-unit-module the interface identification information of the docking part of the first-level sub-unit-module connected to the main unit-module according to the docking part that receives the second electrical signal; and S24: sending by the first-level sub-unit-module the interface identification information of the main unit-module to which the first-level sub-unit-module is to be connected and the interface identification information of the docking part of the first-level sub-unit-module to be connected with the main unit-module to the main unit-module or to an electronic device side.

Preferably, the face recognition process further comprises: S25: sending out by different docking parts of each M-level sub-unit-module different second electrical signals to the (M+1)-level sub-unit-module to which the M-level sub-unit-module is to be connected, or sending out the second electrical signals by different docking parts of each M-level sub-unit-module to the (M+1)-level sub-unit-module to which the M-level sub-unit-module is to be connected in time sequence; S26: determining by the (M+1)-level sub-unit-module the interface identification information of the M-level sub-unit-module to which the (M+1)-level sub-unit-module is to be connected according to the second electrical signal received by the (M+1)-level sub-unit-module, and obtaining by the (M+1)-level sub-unit-module the interface identification information of the docking part of the (M+1)-level sub-unit-module connected to the M-level sub-unit-module according to the docking part that receives the second electrical signal; and S27: sending by the (M+1)-level sub-unit-module the interface identification information of the M-level sub-unit-module to which the (M+1)-level sub-unit-module is to be connected and the interface identification information of the docking part of the (M+1)-level sub-unit-module to be connected with the M-level sub-unit-module to the main unit-module or to an electronic device side.

Preferably, different sub-unit-modules in the same level have different time sequences for sending interface identification information to the main unit-module, different M-level sub-unit-modules have different time sequences for sending electrical signals to the (M+1)-level sub-unit-modules to which the M-level sub-unit-modules are to be connected; and the face recognition process is performed level by level by the sub-unit-modules, in which the face recognition on the (M+1)-level sub-unit-module is performed after the face recognition on the M-level sub-unit-module is completed.

The present disclosure further provides a prompt system for building a modular apparatus, wherein the prompt system for building the modular apparatus comprises: a modular apparatus which comprises at least two unit-modules, each unit-module comprising at least a docking part by which the at least two unit-modules are connected to each other; a storage module for storing the configuration information of a target modular apparatus and of a constructed entity, the target modular apparatus comprising M unit-modules connected to each other by the docking part; a detection module for obtaining the configuration information of a currently constructed entity which comprises N unit-modules connected to each other by the docking part, N being less than M; a calculation module for calculating at least the position of the docking part where the $(N+1)^{th}$ unit-module should be connected to the constructed entity according to the configuration information of the target modular apparatus and the configuration information of the currently constructed entity; and a prompt module for sending out prompt information according to at least the position of the docking part where the $(N+1)^{th}$ unit-module should be connected to the constructed entity calculated by the calculation module, so as to at least prompt the position of the docking part where the $(N+1)^{th}$ unit-module should be connected.

Preferably, the prompt system for building the modular apparatus further comprises: a match module for determining whether the constructed entity matches the target modular apparatus; and an error indication module for indicating a joint error, wherein if the match module determines that the constructed entity matches the target modular apparatus, the calculation module calculates at least the position of the docking part where the $(N+1)^{th}$ unit-module should be connected to the constructed entity according to the configuration information of the target modular apparatus and the configuration information of the currently constructed entity; or if there is no match, the error indication module indicates a joint error.

Preferably, the at least two unit-modules comprises one main unit-module and at least one sub-unit-module, and the main unit-module and the sub-unit-module are in wired connection through the docking part or both in wireless connection and in wired connection through the docking part; and different docking parts of the main unit-module and the sub-unit-module are provided with different pieces of interface identification information. The sub-unit-module directly connected to the main unit-module is defined as a first-level sub-unit-module; the sub-unit-module connected to the first-level sub-unit-module is defined as a second-level sub-unit-module; and the sub-unit-module connected to the M-level sub-unit-module is defined as a (M+1)-level sub-unit-module, M being an integer greater than or equal to 1. The configuration information of the constructed entity is obtained by N sub-unit-modules through a face recognition process. The face recognition process comprises: sending by the main unit-module a first electrical signal to instruct the sub-unit-module to perform the face recognition; sending out different second electrical signals by different docking parts of the main unit-module, or sending out second electrical signals by the different docking parts of the main unit-module in time sequence; determining by the first-level sub-unit-module the interface identification information of the main unit-module to which the first-level sub-unit-module is to be connected according to the second electrical signal received by the first-level sub-unit-module, and obtaining by the first-level sub-unit-module the interface identification information of the docking part of the first-level sub-unit-module connected to the main unit-module according to the docking part that receives the second electrical signal; and sending by the first-level sub-unit-module the interface identification information of the main unit-module to which the first-level sub-unit-module is to be connected and the interface identification information of the docking part of the first-level sub-unit-module to be connected with the main unit-module to the main unit-module, and obtaining by the main unit-module the configuration information of the constructed entity formed by the main unit-module and the first-level sub-unit-module.

The present disclosure further provides a prompt system for building a modular apparatus. The prompt system for building the modular apparatus comprises: a modular apparatus, which comprises at least two unit-modules, each unit-module comprising at least a docking part by which the unit-modules are connected to each other; a memory and one or more programs, wherein the one or more programs are stored in the memory, the memory communicates with the modular apparatus, and the programs are configured to perform the following instructions: S1: obtaining the configuration information of a target modular apparatus which comprises M unit-modules connected to each other by the docking part; S2: obtaining the configuration information of a currently constructed entity which comprises N unit-modules connected to each other by the docking part, N being less than M; S3: calculating at least the position of the docking part where the $(N+1)^{th}$ unit-module should be connected to the constructed entity according to the configuration information of the target modular apparatus and the configuration information of the currently constructed entity; and S4: sending out prompt information according to at least the position of the docking part where the $(N+1)^{th}$ unit-module should be connected to the constructed entity calculated in step S3, so as to at least prompt the position of the docking part where the $(N+1)^{th}$ unit-module should be connected.

Compared with the prior art, the prompt method for building the modular apparatus provided by the present disclosure can effectively prompt the installation position of the unit-module, so that a joint error rate at a user side during the reconstruction of the modular apparatus is reduced, thereby simplifying the reconstruction work simple.

Developers can conveniently open the configuration data of the modular apparatuses to the user through a database, and the user can easily and quickly reconstruct a robot according to needs of different scenarios.

In this method, the position of each unit-module can be accurately obtained through face recognition, which is simple and quick and has low hardware requirements. The acquisition of the position guarantees that it is possible to correct user operations in real time. When the operation of the user is incorrect, a corresponding joint error prompt is provided, so the user can quickly and easily know the error type, and then can quickly correct it to speed up the process of the reconstruction work.

The prompt system for building the modular apparatus provided by the present disclosure also has the above advantages.

DETAILED DESCRIPTION

To make the objectives, technical solutions and advantages of the present disclosure clearer, the present disclosure will be described in detail below with reference to the accompanying drawings and embodiments. It should be understood that the specific embodiments described herein are only used to explain the present disclosure and are not intended to limit the present disclosure.

Figure 1A:
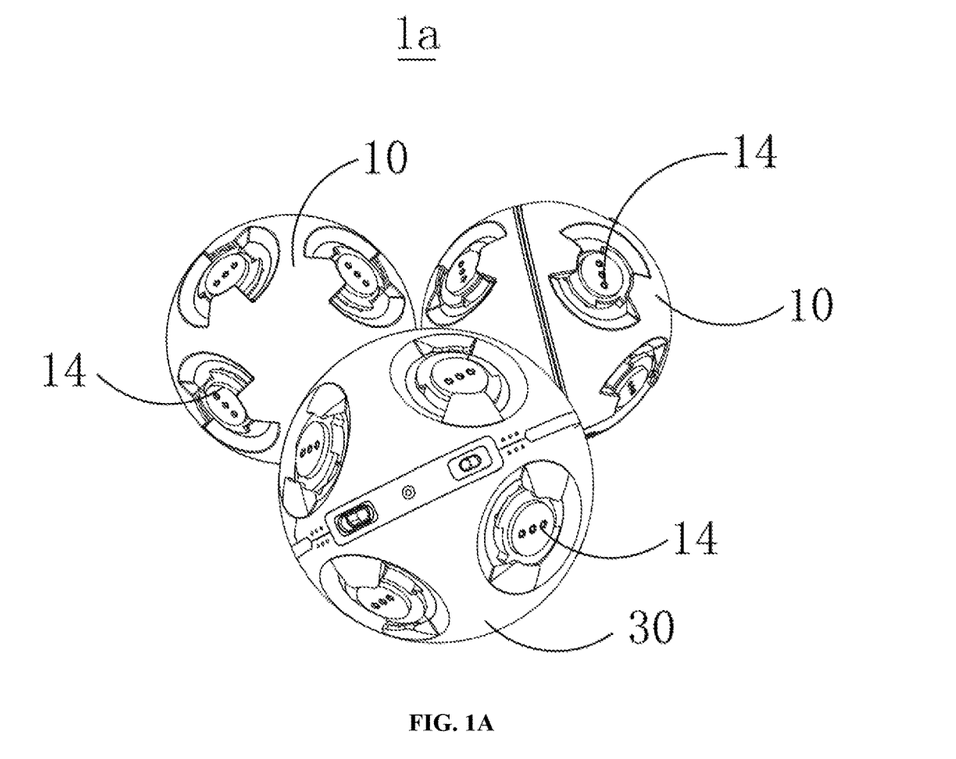
FIG. 1A is a schematic perspective diagram of a modular apparatus in the present disclosure.

The first embodiment of the present disclosure provides a prompt method for building a modular apparatus, which may specifically be a construction prompt method for a modular robot. The modular apparatus 1a shown in FIG. 1A will be described as an example. The modular apparatus 1a comprises at least two unit-modules, and FIG. 1A shows three unit-modules as an example for illustration. Each unit-module comprises at least a docking part 14, preferably at least two docking parts 14. The unit-modules are connected to each other by the docking part 14, and modular apparatuses 1a with different configurations may be reconstructed by different connection ways. Preferably, the number of docking parts 14 on each unit-module is 2, 3, 4, 5, 6, 7 or 8. Preferably, different docking parts 14 of each unit-module are provided with interface identification information to facilitate the determination of the specific connection positions between the unit-modules. As shown in the figure, when the unit-module is provided with 8 docking parts 14, the interface identification information of the 8 docking parts 14 are respectively 001, 002, . . . , and 008. Different unit-modules may be in mechanical connection through the docking part 14 or may also be in wired electrical connection. Preferably, the at least two unit-modules comprise at least one main unit-module 30 and at least one sub-unit-module 10, and the main unit-module 30 and the sub-unit-module 10 are connected. Preferably, the main unit-module 30 and the sub-unit-module 10 are in wired electrical connection through the docking part 14, or in wireless electrical connection through a wireless communication system, for example, using zigbee technology, Bluetooth, NFC and other technologies for wireless communication. It is preferable to perform wireless communication through a zigbee system. Correspondingly, the main unit-module 30 is provided with a zigbee main communication module, and the sub-unit-module 10 is provided with a zigbee sub-communication module 101. Please refer to FIG. 1B, preferably, the sub-unit-module 10 is spherical, and comprises two hemispherical sub-modules 101 opposite to each other; and the two sub-modules 101 may rotate relative to each other, wherein the rotation is preferably controlled by an electrical signal. Preferably, the plane where the docking part 14 is located and the plane where the rotation between the two sub-modules 101 is intersected. The two docking parts 14 may be connected by mutual clamping or magnetic attraction.

Figure 1B:
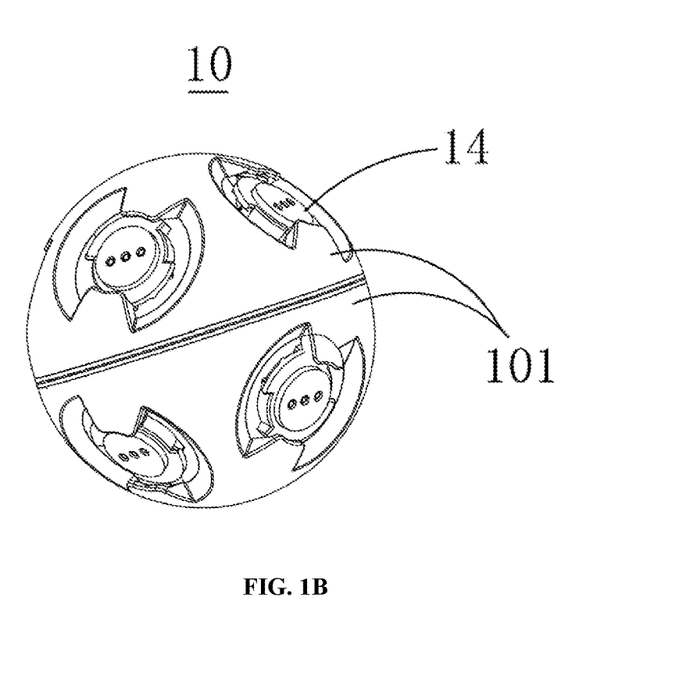
FIG. 1B is a schematic perspective diagram of a sub-unit-module of a modular apparatus in the present disclosure.

It can be understood that the form of the modular apparatus 1a is not limited, and as an alternative, the unit-module may be any structural form, such as a sphere, a wheel, an implementing component, or a sensor. The docking part 14 may only have a mechanical connection function. The unit-modules may also communicate with each other only through a wired electrical connection or a wireless electrical connection. The structures of all unit-modules may be completely the same or at least partly different. In the present embodiment, it is preferable that the main unit-module 30 provides power and transmits signals to the sub-unit-module 10, and the sub-unit-module 10 itself is not provided with a power storage means and a function of communicating with other devices to reduce the cost of the modular apparatus 1a. In the present disclosure, the preferred embodiment of the modular apparatus 1a shown in FIGS. 1A and 1B is taken as an example for illustration.

When a user obtains at least two unit-modules and needs to joint them to form a target modular apparatus (namely, a modular apparatus to be constructed by the user), the prompt method for building the modular apparatus provided by the present disclosure may be adopted, which may greatly reduce joint errors.

Figure 2:
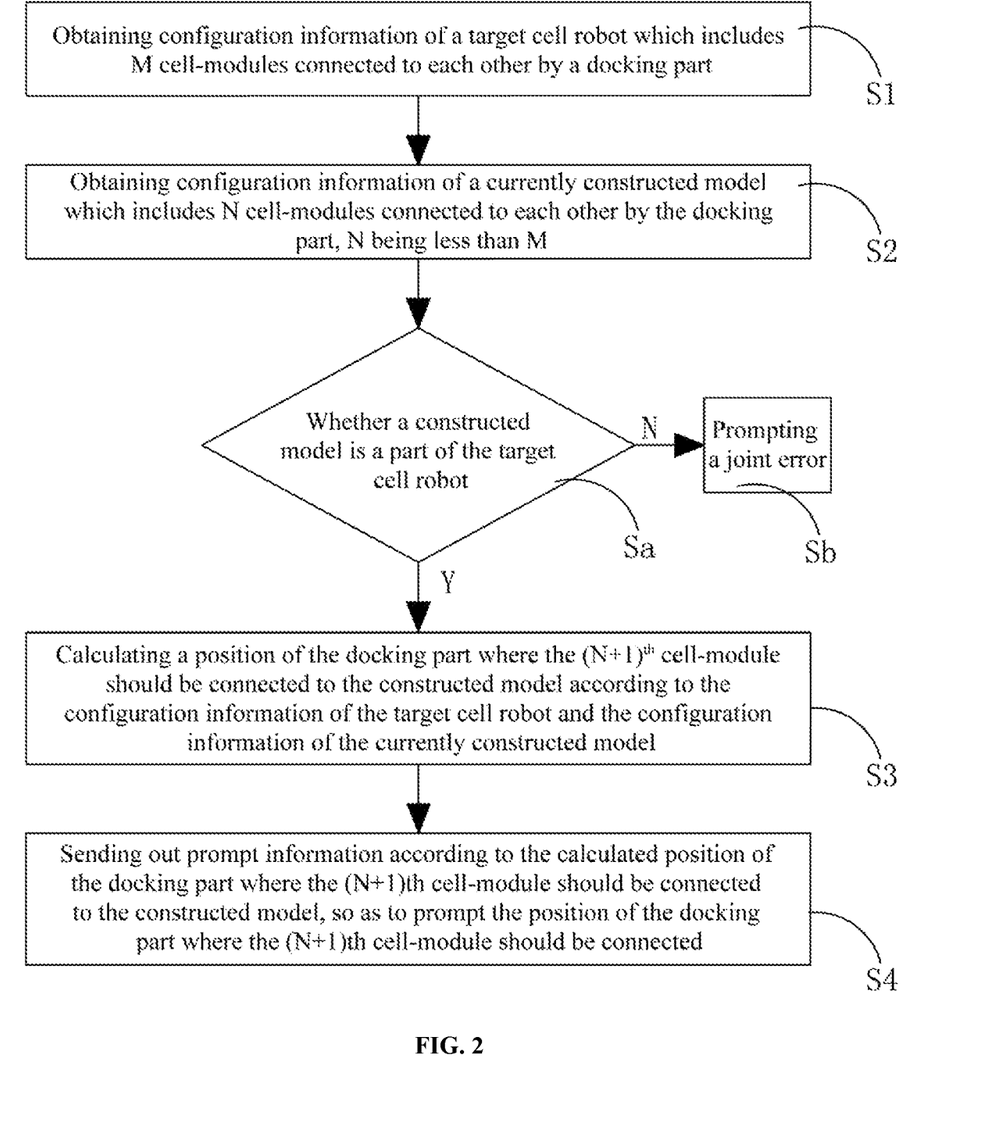
FIG. 2 is a flowchart of a prompt method for building a modular apparatus according to a first embodiment of the present disclosure.

Please refer to FIG. 2, the prompt method for building the modular apparatus comprises the following steps:

In step S1, configuration information of a target modular apparatus is obtained, wherein the target modular apparatus comprises M unit-modules connected to each other by docking parts.

In step S2, configuration information of a currently constructed entity is obtained, wherein the currently constructed entity comprises N unit-modules connected to each other by docking parts, N being less than M.

In step S3, at least the position of the docking part where the $(N+1)^{th}$ unit-module should be connected to the constructed entity is calculated according to the configuration information of the target modular apparatus 1a and the configuration information of the currently constructed entity.

In step S4, prompt information is sent out according to at least the position of the docking part where the $(N+1)^{th}$ unit-module should be connected to the constructed entity calculated in step S3, so as to at least prompt the position of the docking part where the $(N+1)^{th}$ unit-module should be connected.

In step S5, at least the $(N+1)^{th}$ unit-module is connected to the constructed entity according to the prompt information.

Steps S2-S5 are repeated to complete the connection between the unit-modules to obtain the modular apparatus.

Preferably, in step S3, the position of the docking part where multiple unit-modules should be connected to the constructed entity is calculated.

The above configuration information refers to information for determining the configuration of the modular apparatus, and at least comprises interface identification information representing the connection relationship of the unit-modules, and may further comprise type information representing the type of unit-modules and/or quantity information representing the number of unit-modules.

Preferably, an indicating function member is provided at the docking part of the unit-module, is controlled in step S4 to send out indicating information according to the position of the docking part on the constructed entity to be connected calculated in step S3, and may be a lamp, a retractable mechanical structure lamp, and preferably an LED lamp.

Preferably, before step S4, the method further comprises: displaying the configuration of the constructed entity by a display screen in three-dimensional simulation; and expressing in step S4 the prompt information by a three-dimensional simulation model in the ways as follows: displaying (in phantom or solid) in a specific color a portion of the three-dimensional simulation model corresponding to the position of the docking part, or pointing by an indicator to the portion of the three-dimensional simulation model corresponding to the position of the docking part, or demonstrating a joint procedure dynamically.

Preferably, the configuration information of the target modular apparatus in step S1 comes from a database storing configuration information corresponding to a plurality of modular apparatuses.

Preferably, in order to prevent the user from joint errors even under the indication of the prompt information, it is necessary to set up a checking step, that is, between the S2 and S3, the method further comprises step Sa.

In step Sa, whether the constructed entity in step S2 matches the target modular apparatus is determined. It can be understood the matching between the constructed entity and the target modular apparatus refer to the cases that the corresponding parts of both the constructed entity and the target modular apparatus are completely or substantially the same. The "substantially the same" means that the jointed modular apparatus may have the completely same configuration as the target modular apparatus by means of automatic control. For example, when a unit-module has 8 docking parts symmetrically distributed on two sub-unit-modules, the interface identification information of the docking parts on one of the two sub-unit-modules is defined as 001, 003, 005, 007, and these 4 docking parts are arranged in sequence along the circumferential direction. When one unit-module in the target modular apparatus should be connected to the 001 docking part of another unit-module, after the user performs this joint procedure, the one unit-module is jointed on the 003 docking part of the another unit-module. In this case, since the docking parts 001 and 003 are symmetrically distributed, the same configuration as the target modular apparatus may be obtained by means of rotating the sub-unit-module by 180°. Therefore, it is considered that the constructed entity is substantially the same as the target modular apparatus. Conversely, if it is impossible to obtain a configuration that is completely consistent with the target modular apparatus by means of automatic control (e.g., controlling the corresponding sub-unit-module to rotate a preset angle), it is considered as a mismatch. If the constructed entity matches the target modular apparatus, step S3 is performed, or otherwise step Sb is performed: prompting a joint error.

Figure 3A:
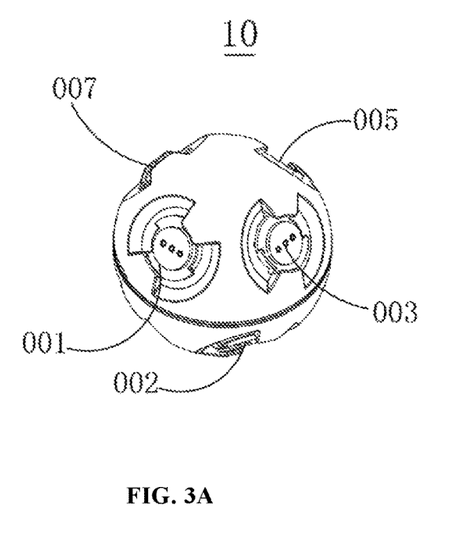
FIGS. 3A and 3B are schematic diagrams of interface arrangement of the sub-unit-modules.
Figure 3B:
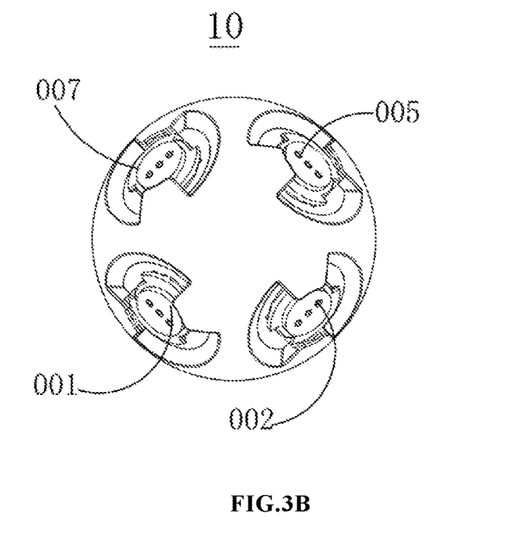
Figure 4A:
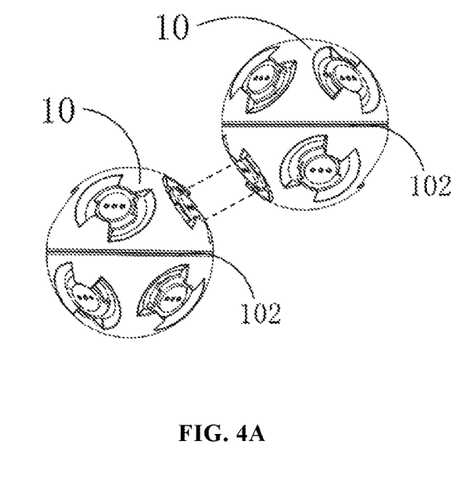
FIGS. 4A and 4B are schematic diagrams of parallel joint lines and cross joint lines in the joint of sub-unit-modules.
Figure 4B:
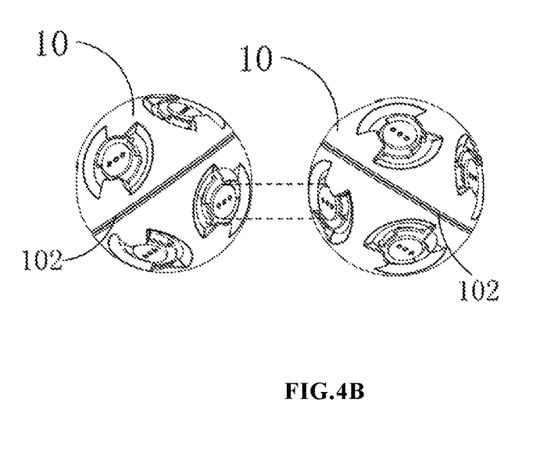

Preferably, when there is a joint error, i.e., the mismatch between the configuration information of the constructed entity and the configuration information of the target modular apparatus, namely, the mismatch between one or more pieces of type information, quantity information and interface identification information, different kinds of joint errors are prompted according to the different pieces of error information. For example, when a main unit-module is jointed by the user at a position where a sub-unit-module should be jointed (the sub-unit-module and the main unit-module belong to different type of modules), a type error is prompted here. If the interface identification information indicates an error (when the constructed entity is substantially the same as the target modular apparatus, the interface identification information is not prompted as an error), at least two types of errors may be prompted: one is a position error and another is a parallel-cross error. Please refer to FIGS. 3A and 3B, for example, when a unit-module has 8 docking parts symmetrically distributed, the interface identification information of the docking parts arranged in sequence along the circumferential direction on the first sub-unit-module of the unit-module is defined as 001,003, 005, and 007, and the interface identification information of the docking parts arranged in sequence along the circumferential direction on the second sub-unit-module of the unit-module is defined as 002,004,006, and 008. Position errors comprise but are not limited to the case that when two unit-modules should be connected to the 001 and 002 docking parts of another unit-module (adjacent docking parts of different hemispheres), one of them is connected to the second sub-unit-module (a different hemisphere) or to the 001 and 003 docking parts (the opposite docking parts on the same hemisphere). In this case, it is impossible to match the constructed entity with the target modular apparatus by controlling the rotation of the sub-unit-module, so a position error is prompted in this case. Please refer to FIGS. 4A and 4B, two sub-unit-modules are connected at a joint line 102. When two unit-modules are jointed at different docking parts, the joint lines 102 of the two unit-modules have two positional relationships: parallel (FIG. 4A) and cross (FIG. 4B). The positional relationships of parallel and cross affect the final configuration. For example, when two-unit-modules which should have a parallel joint line after joint are jointed and have a cross joint line, it will cause the configuration of the modular apparatus to be incorrect or cause the modular apparatus to lose degree of freedom in some dimensions. In this case, a parallel-cross error is prompted.

Preferably, when the constructed entity is substantially the same as the corresponding portion of the target modular apparatus, the angle that needs to be rotated between the two of the sub-unit-modules is recorded, so that it can be taken into account when the modular apparatus is subsequently controlled to rotate.

Figure 5:
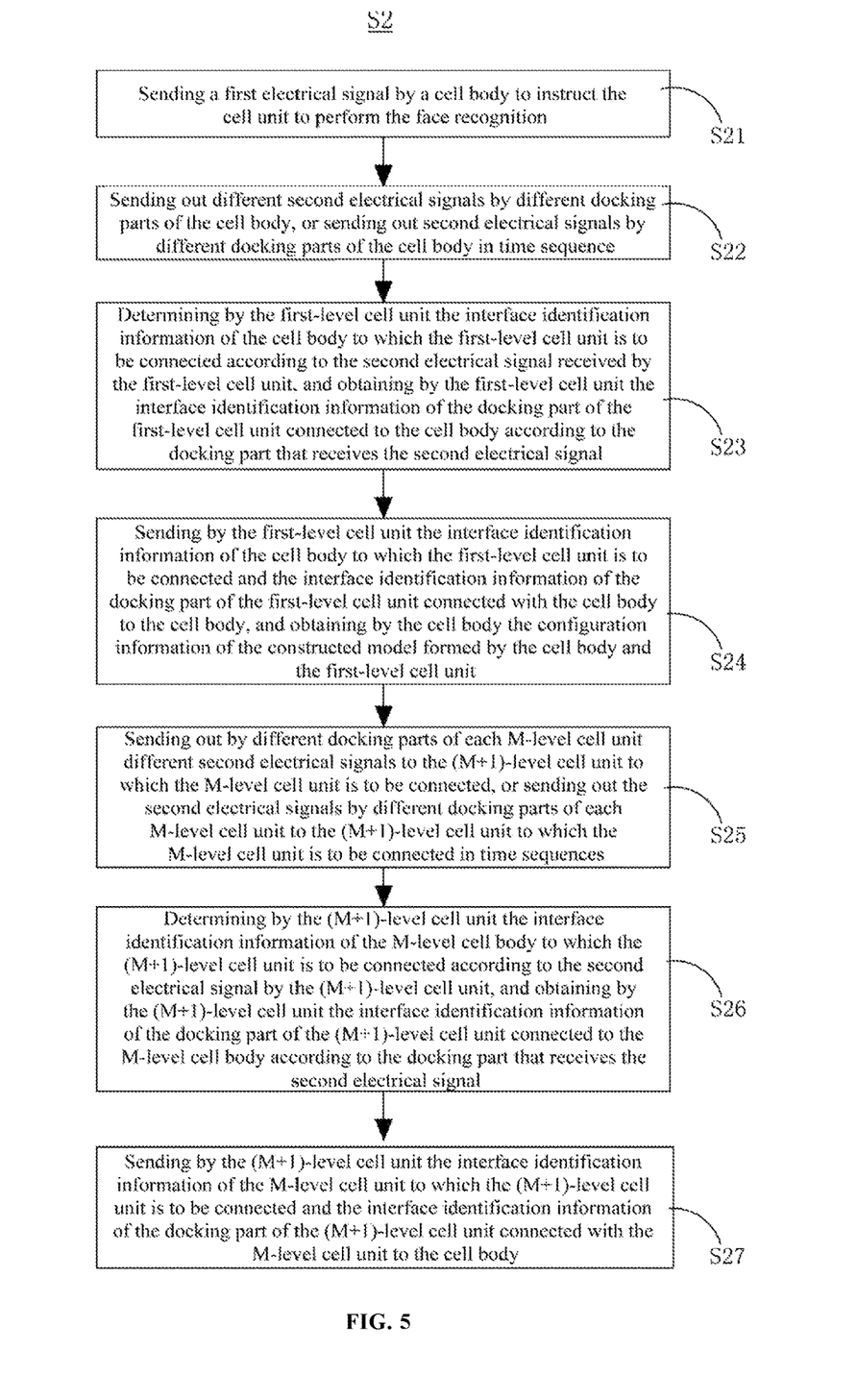
FIG. 5 is a detailed flowchart of step S2 in FIG. 2.

Please refer to FIG. 5, in step S2, the configuration information of the constructed entity is obtained by N sub-unit-modules through a face recognition process. The sub-unit-module directly connected to the main unit-module is defined as a first-level sub-unit-module, the sub-unit-module connected to the first-level sub-unit-module is defined as a second-level sub-unit-module, and the sub-unit-module connected to the M-level sub-unit-module is defined as a (M+1)-level sub-unit-module, M being an integer greater than or equal to 1. The face recognition process of a specific constructed entity comprises the following steps.

In step S21, the main unit-module sends a first electrical signal to instruct the sub-unit-module to perform the face recognition.

In step S22, different docking parts of the main unit-module send different second electrical signals, or send second electrical signals in time sequence.

In step S23, the first-level sub-unit-module determines the interface identification information of the main unit-module to which the first-level sub-unit-module is to be connected according to the second electrical signal received by the first-level sub-unit-module, and obtains the interface identification information of its docking part connected to the main unit-module according to the docking part that receives the second electrical signal.

In step S24, the first-level sub-unit-module sends the interface identification information of the main unit-module to which the first-level sub-unit-module is to be connected and the interface identification information of its docking part connected with the main unit-module to the main unit-module, and the main unit-module obtains the configuration information of the constructed entity formed by the main unit-module and the first-level sub-unit-module.

Specifically, the face recognition process further comprises the following steps.

In step S25, different docking parts of each M-level sub-unit-module send out different second electrical signals to the (M+1)-level sub-unit-module to which the M-level sub-unit-module is to be connected, or send out the second electrical signals to the (M+1)-level sub-unit-module to which the M-level sub-unit-module is to be connected in time sequence.

In step S26, the (M+1)-level sub-unit-module determines the interface identification information of the M-level sub-unit-module to which the (M+1)-level sub-unit-module is to be connected according to the second electrical signal received by the (M+1)-level sub-unit-module, and obtains the interface identification information of its docking part connected to the M-level sub-unit-module according to the docking part that receives the second electrical signal.

In step S27, the (M+1)-level sub-unit-module sends the interface identification information of the M-level sub-unit-module to which the (M+1)-level sub-unit-module is to be connected and the interface identification information of its docking part to be connected with the M-level sub-unit-module to the main unit-module or to an electronic device side.

Preferably, different sub-unit-modules in the same level have different time sequences for sending interface identification information to the main unit-module; different M-level sub-unit-modules have different time sequences for sending electrical signals to the (M+1)-level sub-unit-modules to which the M-level sub-unit-modules are to be connected; and the face recognition process is performed level by level by the sub-unit-modules, in which the face recognition on the (M+1)-level sub-unit-module is performed after the face recognition on the M-level sub-unit-module is completed.

Preferably, after step S24, the main unit-module stops sending the second electrical signal, and the main unit-module wirelessly instructs the first-level sub-unit-module to send the second electrical signal to the second-level sub-unit-module. After the main unit-module receives the information returned by the (M+1)-level sub-unit-module, the M-level sub-unit-module stops sending the second electrical signal, and the main unit-module wirelessly instructs the (M+1)-level sub-unit-module to send the second electrical signal to the (M+2)-level sub-unit-module.

It can be understood that in the face recognition process, the main unit-module only serves as a starting point for face recognition as a reference point to define the relative position of the sub-unit-module with respect to the main unit-module. Optionally, the mechanical structure and/or circuit structure of the main unit-module and those of the sub-unit-module may be completely consistent.

As a variant, the first signal may also be transmitted in a wired manner. The first signal may be sent through an electronic device side. After obtaining the relevant interface identification information, the sub-unit-module directly transmits it to the electronic device side. That is, each module may have a communication function with the electronic device side.

Description will be made with an example in which the docking parts with the interface identification information 001 and 002 of the main unit module is connected with a sub-unit-module No. 1 and a sub-unit-module No. 2 respectively, and the sub-unit-module No. 1 is connected with a sub-unit-module No. 3 and a sub-unit-module No. 4 through docking parts, the sub-unit-module 2 is connected with a sub-unit-module No. 5 and a sub-unit-module No. 6 through docking parts. Preferably, the main unit-module broadcasts information wirelessly, that is, sends a first electrical signal to the sub-unit-module to instruct the sub-unit-module to perform face recognition. Different docking parts of the main unit-module send out different second electrical signals, and the different second electrical signals may be voltage signals or current signals of different sizes, or electrical signals in different frequency bands. The sub-unit-module No. 1 and the sub-unit-module No. 2 may know the interface identification information of the docking parts of the main unit-module to which the sub-unit-modules No. 1 and No. 2 are to be specifically connected by identifying different second electrical signals. Since the different docking parts of each unit-module are provided with interface identification information, when receiving the second electrical signal, the sub-unit-module No. 1 and the sub-unit-module No. 2 may obtain the interface identification information of their docking parts connected to the main unit-module. The sub-unit-module No. 1 first replies to the main unit-module to inform it of the interface identification information of the main unit-module connected and the interface identification information of its docking part connected with the main unit-module. After waiting for a period of time, the sub-unit-module No. 2 replies to the main unit-module. After the face recognition of the sub-unit-module No. 1 and the sub-unit-module No. 2 is completed, the main unit-module stops sending electrical signals and instructs the sub-unit-module No. 1 and the sub-unit-module No. 2 directly connected to the main unit-module to send the second electrical signals in time sequence to the sub-unit-modules No. 3, No. 4, No. 5 and No. 6. The sub-unit-module No. 1 first sends out the second electrical signals to the sub-unit-modules No. 3 and No. 4, and sub-unit-modules No. 3 and No. 4 return relevant interface identification information to the main unit-module according to the above principle. Then the sub-unit-module No. 2 first sends out the second electrical signals to the sub-unit-modules No. 5 and No. 6, and sub-unit-modules No. 5 and No. 6 return relevant interface identification information to the main unit-module according to the above principle. So far, the main unit-module obtains the relative position information between the unit-modules of the constructed entity.

Preferably, after receiving the relevant interface identification information transmitted from the sub-unit-module, the main unit-module numbers the sub-unit-module to generate the ID of each sub-unit-module to facilitate communication. Preferably, the ID is convenient for returning the relative angle between two of the sub-unit-modules, and for receiving the signal to control the sub-unit-module to rotate at a set angle.

Preferably, each unit-module carries type information; and the type information of unit-modules of the same type is the same. For example, the type information of the main unit-module is different from the type information of the sub-unit-module, and the type information of different sub-unit-modules is the same. The signal fed back by the unit-module when being powered on and accessed carries the type information.

Preferably, the configuration information of the target modular apparatus in step S1 comes from a database storing configuration information corresponding to several modular apparatuses.

It can be understood that the usage scenarios of the prompt method for building the modular apparatus provided by the present disclosure may be as follows: the electronic device side is provided with a database storing configuration information corresponding to several modular apparatuses, and the electronic device side and the modular apparatus may communicate with each other. Preferably, the modular apparatus communicates with the sub-unit-module via the main unit-module. When the user selects a modular apparatus in the database at the electronic device side, i.e., when step S1 is performed, the modular apparatus is displayed in three-dimensions, and the user performs a joint procedure according to the modular apparatus displayed in three-dimensions. For example, when the user needs to joint a sub-unit-module to the main unit-module, before the sub-unit-module is jointed on the main unit-module, the electronic device side performs steps S2-S4, and the user joints the sub-unit-module on the main unit-module according to the prompt information. That is, step S5 is performed.

As a variant, the database may also be provided in the main unit-module, and steps S1-S4 are all performed by the main unit-module.

Compared with the prior art, the prompt method for building the modular apparatus provided by the present disclosure can effectively prompt the installation position of the unit-module, so that the joint error rate at the user side during the reconstruction of the modular apparatus is reduced, simplifying the reconstruction work.

Developers can conveniently open the configuration data of the modular apparatuses to the user through a database, and the user can easily and quickly reconstruct a robot according to the needs of different scenarios.

In this method, the position of each unit-module can be accurately obtained through face recognition, which is simple and quick and has low hardware requirements. The acquisition of the position guarantees that it is possible to correct user operations in real time. When the operation of the user is incorrect, a corresponding joint error prompt is provided, so the user can quickly and easily know the error type, and then can quickly correct it to speed up the process of the reconstruction work.

Figure 6:
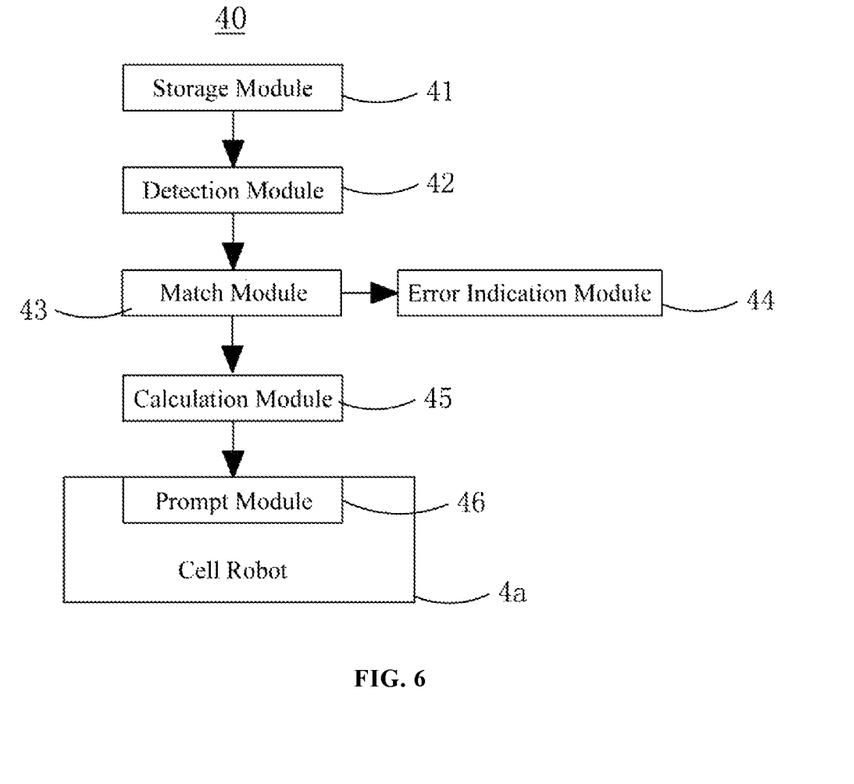
FIG. 6 is a schematic diagram of the modules structure of a prompt system for building a modular apparatus according to a second embodiment of the disclosure.

Please refer to FIG. 6, which shows a prompt system for building a modular apparatus 4a according to a second embodiment of the present disclosure. The prompt system for building the modular apparatus 4a comprises: a modular apparatus 4a, a storage module 41, a detection module 42, a calculation module 45 and a prompt module 46. The modular apparatus 4a comprises at least two unit-modules, wherein each unit-module comprises at least a docking part (preferably at least two docking parts) by which the at least two unit-modules are connected to each other, and preferably, the modular apparatus 4a disclosed in the first embodiment may be adopted. The storage module 41 is configured for storing the configuration information of the target modular apparatus 4a and the configuration information of a constructed entity, the target modular apparatus 4a comprising M unit-modules connected to each other by the docking part. The detection module 42 is configured for obtaining the configuration information of a currently constructed entity which comprises N unit-modules connected to each other by the docking part, N being less than M. The calculation module 45 is configured for calculating at least the position of the docking part where the $(N+1)^{th}$ unit-module should be connected to the constructed entity according to the configuration information of the target modular apparatus 4a and the configuration information of the currently constructed entity. The prompt module 46 is configured for sending out prompt information according to at least the position of the docking part where the $(N+1)^{th}$ unit-module should be connected to the constructed entity calculated by the calculation module 45, so as to at least prompt the position of the docking part where the $(N+1)^{th}$ unit-module should be connected.

One or more of the storage module 41, the detection module 42, the calculation module 45 and the prompt module 46 may be arranged at the electronic device side or in one of the unit-modules.

Preferably, the prompt module 46 is an indicating function member arranged at the docking part. As another option, the prompt module 46 is a display screen; and the constructed entity is displayed on the display screen in three-dimensional simulation, wherein the portion of a three-dimensional simulation model corresponding to the position of the docking part is displayed in a specific color, or an indicator is used to point to the portion of the three-dimensional simulation model corresponding to the position of the docking part, or a joint procedure is demonstrated dynamically.

The prompt system for building the modular apparatus 4a further comprises a match module 43 and an error indication module 44. The match module 43 is configured to determine whether the constructed entity matches the target modular apparatus 4a. The principle for determining whether it matches is the same as that in the first embodiment and will not be repeated here. If the match module 43 determines that the constructed entity matches the target modular apparatus 4a, the calculation module 45 calculates the position of the docking part where the $(N+1)^{th}$ unit-module should be connected to the constructed entity according to the configuration information of the target modular apparatus 4a and the configuration information of the currently constructed entity. Conversely, when there is no match, the error indication module 44 is configured to indicate an error and indicate different type errors as described in the first embodiment.

It can be understood that preferably, a display screen may be built in the prompt module 46.

A third embodiment of the present disclosure provides a prompt system for building a modular apparatus. The prompt system for building the modular apparatus comprises a modular apparatus which comprises at least two unit-modules, each unit-module comprising at least two docking parts by which several unit-modules are connected to each other; a memory, and one or more programs, wherein the one or more programs are stored in the memory, the memory communicates with the unit-module, and the programs are configured to perform the following instructions:

S1: obtaining the configuration information of a target modular apparatus which comprises M unit-modules connected to each other by the docking part;

S2: obtaining the configuration information of a currently constructed entity which comprises N unit-modules connected to each other by the docking part, N being less than M;

S3: calculating at least the position of the docking part where the $(N+1)^{th}$ unit-module should be connected to the constructed entity according to the configuration information of the target modular apparatus and the configuration information of the currently constructed entity; and S4: sending out prompt information according to at least the position of the docking part where the $(N+1)^{th}$ unit-module should be connected to the constructed entity calculated in step S3, so as to at least prompt the position of the docking part where the $(N+1)^{th}$ unit-module should be connected.

The program is not limited to performing the above steps, it may also be configured to perform any of the steps described in the first embodiment, such as face recognition.

It can be understood that in the present disclosure, the joint positions of the sub-unit-modules at the same level may be prompted at the same time or a part of the joint positions may be prompted at the same time. Of course, it is also possible to prompt the joint positions one by one.

It can be understood that the modular apparatus described in the present disclosure may be a complete modular robot, such as a quadruped robot, or a part of the robot, such as one of the legs of the quadruped robot.

The above are only preferred embodiments of the present disclosure and are not intended to limit the present disclosure. Any modification, equivalent replacement and improvement made within the principles of the present disclosure should be included in the protection scope of the present disclosure.

The invention claimed is:

1. A prompt method for building a modular apparatus, the modular apparatus comprising at least two unit-modules and each unit-module comprising at least a docking part by which the unit-modules are connected to each other, the at least two unit-modules may be mechanically connected or wired-electrically connected through the docking part; the at least two unit-modules comprising at least one main unit-module and at least one sub-unit-module, and the main unit-module and the sub-unit-module are in wired connection through the docking part or both in wireless connection and in wired connection through the docking part: wherein the prompt method for building the modular apparatus comprises:

S1: obtaining configuration information of a target modular apparatus which comprises M unit-modules connected to each other by the docking part;

S2: obtaining configuration information of a currently constructed entity which comprises N unit-modules connected to each other by the docking part, N being less than M;

S3: calculating at least a position of the docking part where the $(N+1)^{th}$ unit-module should be connected to the currently constructed entity according to the configuration information of the target modular apparatus and the configuration information of the currently constructed entity; and S4: sending out prompt information according to at least the position of the docking part where the $(N+1)^{th}$ unit-module should be connected to the currently constructed entity calculated in step S3, so as to prompt at least the position of the docking part where the $(N+1)^{th}$ unit-module should be connected.

2. The prompt method for building the modular apparatus of claim 1, wherein the prompt method for building the modular apparatus further comprises:

S5: connecting at least the $(N+1)^{th}$ unit-module to the currently constructed entity according to the prompt information; and repeating steps S2-S5 to complete the connection between the unit-modules to obtain the modular apparatus.

3. The prompt method for building the modular apparatus of claim 1, wherein an indicating function member is arranged at the docking part of the unit-module, and the indicating function member is controlled in step S4 to send out indicating information according to the position of the docking part on the currently constructed entity to be connected calculated in step S3.

4. The prompt method for building the modular apparatus of claim 1, wherein before step S4, the method further comprises: displaying the configuration of the currently constructed entity by a display screen in three-dimensional simulation; and expressing in step S4 the prompt information by a three-dimensional simulation model in the ways as follows: displaying in a specific color a portion of the three-dimensional simulation model corresponding to the position of the docking part, or pointing by an indicator to the portion of the three-dimensional simulation model corresponding to the position of the docking part, or demonstrating a joint procedure dynamically.

5. The prompt method for building the modular apparatus of claim 1, wherein the configuration information of the target modular apparatus in step S1 comes from a database storing configuration information corresponding to a plurality of modular apparatuses.

6. The prompt method for building the modular apparatus of claim 1, wherein between step S2 and step S3, the method further comprises:
- Sa: determining whether the currently constructed entity in step S2 matches the target modular apparatus; and performing step S3 if the currently constructed entity matches the target modular apparatus, or otherwise, performing Sb:
- prompting a joint error.

7. The prompt method for building the modular apparatus of claim 6, wherein the configuration information comprises one or more pieces of type information representing the type of the unit-modules, quantity information representing the number of the unit-modules, and interface identification information representing a connection relationship of the unit-modules; and in step Sb, when one or more pieces of information in the configuration information of the currently constructed entity indicate errors, prompting different kinds of joint errors according to the different pieces of error information.

8. The prompt method for building the modular apparatus of claim 1, wherein different docking parts of the main unit-module and the sub-unit-module are provided with different interface identification information; the sub-unit-module directly connected to the main unit-module is defined as a first-level sub-unit-module, the sub-unit-module connected to the first-level sub-unit-module is defined as a second-level sub-unit-module, and the sub-unit-module connected to the M-level sub-unit-module is defined as a (M+1)-level sub-unit-module, M being an integer greater than or equal to 1; and in step S2, the configuration information of the currently constructed entity is obtained by N sub-unit-modules through a process of a face recognition, the process of the face recognition comprises:
- S21: sending a first electrical signal to instruct the sub-unit-module to perform the face recognition;
- S22: sending out different second electrical signals by different docking parts of the main unit-module, or sending out second electrical signals by different docking parts of the main unit-module in time sequence;
- S23: determining by the first-level sub-unit-module the interface identification information of the main unit-module to which the first-level sub-unit-module is to be connected according to the second electrical signal received by the first-level sub-unit-module, and obtaining by the first-level sub-unit-module the interface identification information of the docking part of the first-level sub-unit-module connected to the main unit-module according to the docking part that receives the second electrical signal; and
- S24: sending by the first-level sub-unit-module the interface identification information of the main unit-module to which the first-level sub-unit-module is to be connected and the interface identification information of the docking part of the first-level sub-unit-module connected with the main unit-module to the main unit-module or to an electronic device side.

9. The prompt method for building the modular apparatus of claim 8, wherein the process of the face recognition further comprises:
- S25: sending out by different docking parts of each M-level sub-unit-module different second electrical signals to the (M+1)-level sub-unit-module to which the M-level sub-unit-module is to be connected, or sending out the second electrical signals by different docking parts of each M-level sub-unit-module to the (M+1)-level sub-unit-module to which the M-level sub-unit-module is to be connected in time sequence;
- S26: determining by the (M+1)-level sub-unit-module the interface identification information of the M-level sub-unit-module to which the (M+1)-level sub-unit-module is to be connected according to the second electrical signal by the (M+1)-level sub-unit-module, and obtaining by the (M+1)-level sub-unit-module the interface identification information of the docking part of the (M+1)-level sub-unit-module connected to the M-level sub-unit-module according to the docking part that receives the second electrical signal; and
- S27: sending by the (M+1)-level sub-unit-module the interface identification information of the M-level sub-unit-module to which the (M+1)-level sub-unit-module is to be connected and the interface identification information of the docking part of the (M+1)-level sub-unit-module to be connected with the M-level sub-unit-module to the main unit-module or to an electronic device side.

10. The prompt method for building the modular apparatus of claim 9, wherein different sub-unit-modules in the same level have different time sequences for sending interface identification information to the main unit-module; different M-level sub-unit-modules have different time sequences for sending electrical signals to the (M+1)-level sub-unit-modules to which the M-level sub-unit-modules are to be connected; and the process of the face recognition is performed level by level by the sub-unit-modules, in which the face recognition on the (M+1)-level sub-unit-module is performed after the face recognition on the M-level sub-unit-module is completed.

11. A prompt system for building a modular apparatus, wherein the prompt system for building the modular apparatus comprises:
- a modular apparatus which comprises at least two unit-modules, each unit-module comprising at least a docking part by which the at least two unit-modules are connected to each other, the at least two unit-modules may be mechanically connected or wired-electrically connected through the docking part: the at least two unit-modules comprising at least one main unit-module and at least one sub-unit-module, and the main unit-module and the sub-unit-module are in wired connection through the docking part or both in wireless connection and in wired connection through the docking part;
- a storage module for storing configuration information of a target modular apparatus and configuration information of a currently constructed entity, the target modular apparatus comprising M unit-modules connected to each other by the docking part;
- a detection module for obtaining configuration information of a currently constructed entity which comprises N unit-modules connected to each other by the docking part, N being less than M;
- a calculation module for calculating at least the position of the docking part where the $(N+1)^{th}$ unit-module should be connected to the currently constructed entity according to the configuration information of the target modular apparatus and the configuration information of the currently constructed entity; and
- a prompt module for sending out prompt information according to at least the position of the docking part where the $(N+1)^{th}$ unit-module should be connected to the currently constructed entity calculated by the calculation module, so as to at least prompt the position of the docking part where the $(N+1)^{th}$ unit-module should be connected.

12. The prompt system for building the modular apparatus of claim 11, wherein the prompt system for building the modular apparatus further comprises:
a match module for determining whether the currently constructed entity matches the target modular apparatus; and
an error indication module for indicating a joint error;
wherein if the match module determines that the currently constructed entity matches the target modular apparatus, the calculation module calculates at least the position of the docking part where the $(N+1)^{th}$ unit-module should be connected to the currently constructed entity according to the configuration information of the target modular apparatus and the configuration information of the currently constructed entity; or if there is no match, the error indication module indicates a joint error.

13. The prompt system for building the modular apparatus of claim 11, wherein different docking parts of the main unit-module and the sub-unit-module are provided with different interface identification information; the sub-unit-module directly connected to the main unit-module is defined as a first-level sub-unit-module, the sub-unit-module connected to the first-level sub-unit-module is defined as a second-level sub-unit-module, and the sub-unit-module connected to the M-level sub-unit-module is defined as a (M+1)-level sub-unit-module, M being an integer greater than or equal to 1; and the configuration information of the currently constructed entity is obtained by N sub-unit-modules through a process of a face recognition, the process of the face recognition comprises: sending by the main unit-module a first electrical signal to instruct the sub-unit-module to perform the face recognition; sending out different second electrical signals by different docking parts of the main unit-module, or sending out second electrical signals by different docking parts of the main unit-module in time sequence; determining by the first-level sub-unit-module the interface identification information of the main unit-module to which the first-level sub-unit-module is to be connected according to the second electrical signal received by the first-level sub-unit-module, and obtaining by the first-level sub-unit-module the interface identification information of the docking part of the first-level sub-unit-module connected to the main unit-module according to the docking part that receives the second electrical signal; and sending by the first-level sub-unit-module the interface identification information of the main unit-module to which the first-level sub-unit-module is to be connected and the interface identification information of the docking part of the first-level sub-unit-module connected with the main unit-module to the main unit-module, and obtaining by the main unit-module the configuration information of the currently constructed entity formed by the main unit-module and the first-level sub-unit-module.

14. A prompt system for building a modular apparatus, wherein the prompt system for building the modular apparatus comprises:
a modular apparatus which comprises at least two unit-modules, each unit-module comprising at least a docking part by which unit-modules are connected to each other, the at least two unit-modules may be mechanically connected or wired-electrically connected through the docking part; the at least two unit-modules comprising at least one main unit-module and at least one sub-unit-module, and the main unit-module and the sub-unit-module are in wired connection through the docking part or both in wireless connection and in wired connection through the docking part:
a memory and one or more programs, wherein the one or more programs are stored in the memory, the memory communicates with the modular apparatus, and the programs are configured to perform the following instructions:
S1: obtaining configuration information of a target modular apparatus which comprises M unit-modules connected to each other by the docking part;
S2: obtaining configuration information of a currently constructed entity which comprises N unit-modules connected to each other by the docking part, N being less than M;
S3: calculating at least a position of the docking part where the $(N+1)^{th}$ unit-module should be connected to the currently constructed entity according to the configuration information of the target modular apparatus and the configuration information of the currently constructed entity; and
S4: sending out prompt information according to at least the position of the docking part where the $(N+1)^{th}$ unit-module should be connected to the currently constructed entity calculated in step S3, so as to at least prompt the position of the docking part where the $(N+1)^{th}$ unit-module should be connected.

* * * * *